US009210424B1

(12) United States Patent
Rintaluoma et al.

(10) Patent No.: US 9,210,424 B1
(45) Date of Patent: Dec. 8, 2015

(54) ADAPTIVE PREDICTION BLOCK SIZE IN VIDEO CODING

(71) Applicant: Google Inc., Mountain View, CA (US)

(72) Inventors: Tero Mikko Rintaluoma, Oulu (FI); Sami Aleksi Pietilä, Oulu (FI)

(73) Assignee: GOOGLE INC., Mountain View, CA (US)

( * ) Notice: Subject to any disclaimer, the term of this patent is extended or adjusted under 35 U.S.C. 154(b) by 472 days.

(21) Appl. No.: 13/780,462

(22) Filed: Feb. 28, 2013

(51) Int. Cl.
H04B 1/66 (2006.01)
H04N 19/50 (2014.01)

(52) U.S. Cl.
CPC ................ H04N 19/00569 (2013.01)

(58) Field of Classification Search
CPC ................................. H04N 19/00569
See application file for complete search history.

(56) References Cited

U.S. PATENT DOCUMENTS

| 4,924,310 | A | 5/1990 | von Brandt |
| 5,148,269 | A | 9/1992 | de Haan et al. |
| 5,337,086 | A | 8/1994 | Fujinami |
| 5,512,952 | A | 4/1996 | Iwamura |
| 5,537,155 | A | 7/1996 | O'Connell |
| 5,617,541 | A | 4/1997 | Albanese et al. |
| 5,675,384 | A | 10/1997 | Ramamurthy |
| 5,719,642 | A | 2/1998 | Lee |
| 5,731,840 | A | 3/1998 | Kikuchi et al. |
| 5,886,742 | A | 3/1999 | Hibi et al. |
| 5,991,447 | A | 11/1999 | Eifrig et al. |
| 6,005,980 | A | 12/1999 | Eifrig et al. |
| 6,141,053 | A | 10/2000 | Saukkonen |

(Continued)

FOREIGN PATENT DOCUMENTS

| EP | 0806866 | 11/1997 |
| EP | 0634873 | 9/1998 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

Primary Examiner — Tat Chio
(74) Attorney, Agent, or Firm — Young Basile Hanlon & MacFarlane P.C.

(57) ABSTRACT

The maximum block size associated with predicting blocks in frames of video data is adaptively determined. The distribution of optimal prediction block sizes associated with one or more existing frames of video data is identified, and a candidate maximum prediction block size is identified (e.g., based on the most prevalent prediction block size in the distribution of prediction block sizes). A variable associated with the level of use of blocks having the candidate maximum prediction block size is compared with thresholds associated with the current maximum prediction block size. If the level of use is between upper and lower thresholds, the next maximum prediction block size set equal to the current maximum prediction block size. If the level of use is greater or less than the upper or lower thresholds, respectively, the next maximum block size is set to the current maximum prediction block size plus or minus one block size and bounded by the largest and smallest prediction block sizes of the encoder.

20 Claims, 8 Drawing Sheets

(56) References Cited

U.S. PATENT DOCUMENTS

| | | |
|---|---|---|
| 6,236,682 B1 | 5/2001 | Ota |
| 6,272,179 B1 | 8/2001 | Kadono |
| 6,289,049 B1 | 9/2001 | Kim et al. |
| 6,324,540 B1 | 11/2001 | Khanna |
| 6,330,344 B1 | 12/2001 | Kondo |
| 6,359,929 B1 | 3/2002 | Boon |
| 6,381,277 B1 | 4/2002 | Chun et al. |
| 6,385,245 B1 | 5/2002 | De Haan |
| 6,404,738 B1 | 6/2002 | Reininger et al. |
| 6,411,602 B2 | 6/2002 | Schoenblum et al. |
| 6,449,312 B1 | 9/2002 | Zhang et al. |
| 6,456,591 B1 | 9/2002 | Mishra |
| 6,483,874 B1 | 11/2002 | Panusopone et al. |
| 6,535,238 B1 | 3/2003 | Kressin |
| 6,700,934 B2 | 3/2004 | Lin |
| 6,711,211 B1 | 3/2004 | Lainema |
| 6,721,327 B1 | 4/2004 | Ekudden |
| 6,771,703 B1 | 8/2004 | Oguz et al. |
| 6,778,553 B1 | 8/2004 | Chou |
| 6,937,770 B1 | 8/2005 | Oguz et al. |
| 7,010,037 B2 | 3/2006 | Ye et al. |
| 7,065,004 B2 | 6/2006 | Jiao et al. |
| 7,450,640 B2 | 11/2008 | Kim et al. |
| 7,584,475 B1 | 9/2009 | Lightstone et al. |
| 7,843,995 B2 | 11/2010 | Bhaskaran et al. |
| 7,983,493 B2 | 7/2011 | Zhang |
| 7,997,953 B2 | 8/2011 | Kamiya et al. |
| 8,175,161 B1 | 5/2012 | Anisimov |
| 8,204,114 B2 | 6/2012 | Wang et al. |
| 8,224,100 B2 | 7/2012 | Jeong |
| 2002/0009149 A1 | 1/2002 | Rodriguez |
| 2002/0031272 A1 | 3/2002 | Bagni et al. |
| 2002/0039386 A1 | 4/2002 | Han et al. |
| 2002/0146071 A1 | 10/2002 | Liu |
| 2002/0159525 A1 | 10/2002 | Jeong |
| 2003/0007566 A1 | 1/2003 | Peng |
| 2003/0012275 A1 | 1/2003 | Boice et al. |
| 2003/0035477 A1 | 2/2003 | Sekiguchi et al. |
| 2005/0123054 A1 | 6/2005 | Wang et al. |
| 2005/0220444 A1 | 10/2005 | Ohkita et al. |
| 2006/0062481 A1 | 3/2006 | Suvanto |
| 2006/0093036 A1 | 5/2006 | Park et al. |
| 2006/0126729 A1 | 6/2006 | Nakayama |
| 2006/0200733 A1 | 9/2006 | Stankovic et al. |
| 2006/0222078 A1 | 10/2006 | Raveendran |
| 2006/0285598 A1 | 12/2006 | Tulkki |
| 2007/0009034 A1 | 1/2007 | Tulkki |
| 2007/0036215 A1 | 2/2007 | Pan et al. |
| 2007/0071356 A1 | 3/2007 | Caviedes et al. |
| 2008/0046249 A1 | 2/2008 | Thyssen et al. |
| 2008/0089409 A1 | 4/2008 | Xu et al. |
| 2008/0123754 A1 | 5/2008 | Ratakonda et al. |
| 2008/0152258 A1 | 6/2008 | Tulkki |
| 2008/0225735 A1 | 9/2008 | Qiu et al. |
| 2008/0228735 A1 | 9/2008 | Kenedy et al. |
| 2008/0240246 A1 | 10/2008 | Lee et al. |
| 2008/0240254 A1 | 10/2008 | Au et al. |
| 2008/0304763 A1 | 12/2008 | Nagori |
| 2009/0021588 A1 | 1/2009 | Border |
| 2009/0052534 A1 | 2/2009 | Wang et al. |
| 2009/0067495 A1 | 3/2009 | Au et al. |
| 2009/0225834 A1 | 9/2009 | Song et al. |
| 2009/0271814 A1 | 10/2009 | Bosscha |
| 2010/0086029 A1 | 4/2010 | Chen et al. |
| 2010/0142761 A1 | 6/2010 | Venkatapuram et al. |
| 2010/0208802 A1 | 8/2010 | Tsukuba et al. |
| 2010/0238268 A1 | 9/2010 | Tulkki |
| 2010/0246665 A1 | 9/2010 | Brederson et al. |
| 2011/0001643 A1 | 1/2011 | Sze et al. |
| 2011/0249743 A1 | 10/2011 | Zhao et al. |
| 2012/0014615 A1 | 1/2012 | Yang et al. |
| 2012/0128069 A1 | 5/2012 | Sato |
| 2012/0134496 A1 | 5/2012 | Farkash et al. |
| 2012/0213448 A1 | 8/2012 | Malmborg et al. |
| 2012/0294376 A1 | 11/2012 | Tanaka et al. |
| 2013/0022119 A1 | 1/2013 | Chien et al. |
| 2013/0195188 A1* | 8/2013 | Sugio ............... H04N 19/00721 375/240.14 |
| 2014/0286430 A1* | 9/2014 | Lee .................... H04N 19/137 375/240.16 |

FOREIGN PATENT DOCUMENTS

| | | |
|---|---|---|
| EP | 1578116 A1 | 9/2005 |
| FI | 115945 | 8/2005 |
| WO | 9611457 | 5/1998 |
| WO | 0233979 | 4/2002 |
| WO | 02062072 | 8/2002 |
| WO | 02067590 | 8/2002 |
| WO | 02078327 | 10/2002 |
| WO | 03043342 | 5/2003 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Hongliang Li; King Ngi Ngan; Zhenyu Wei, "Fast anad Efficient Method for Block Edge Classification and its Application in H.264/AVC Video Coding." Circuits and Systems for Video Technology, IEEE Transactions on, vol. 18, No. 6, pp. 756, 768, Jun. 2008.

Wang, Yao "Error Control and Concealment for Video Communication: A Review", Proceedings of the IEEE, vol. 86, No. 5, May 1998, 24 pages.

(56) References Cited

OTHER PUBLICATIONS

WebM Project, WebM Video Hardware RTLs, http://www.webmproject.org/hardwaret, 3 pp, (Jun. 27, 2012).
Wikipedia, the free encyclopedia, "Application-specific integrated circuit", http://en.wikipedia.org/wiki/Application-specific_integrated_circuit, 7 pp (Jun. 27, 2012).
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.
Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Secto, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbits with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.

Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
V asudev Bhaskaran et al., "Chapter 6: The MPEG Video Standards", Image and Video Compression Standards—Algorithms & Architectures, Second Edition, 1997, pp. 149-230 Kluwer Academic Publishers.
Vos, Luc De and Stegherr, Michael; "Paranneterizable VLSI Architectures for the Full-Search Block-Matching Algorithm", IEEE Transactions on Circuits and Systems, vol. 36, No. 10, Oct. 1989 New York US pp. 1309-1316.
Tsai et al., "Effective Subblock-Based and Pixel-Based Fast Direction Detections for H.264 Intra Prediction" in IEEE Transactions on Circuits and Systems for Video Technology, vol. 18, No. 7, Jul. 2008.
Tasdizen, et al; "A High Performance Reconfigurable Motion Estimation Hardware Architecture", Design, Automation & Test in Europe Conference & Exhibition, Apr. 20, 2009, IEEE, Piscataway, NJ, US pp. 882-885.
Sunil Kumar Liyang Xu, Mrinal K. Mandal, and Sethuraman Panchanathan, Error Resiliency Schemes in H.264/AVC Standard, Elsevier J. of Visual Communicatio & Image Representation (Special issue on Emerging.H.264/AVC Video Coding Standard), vol. 17 (2), Apr. 2006.
Murat A. Tekalp, "Block-based methods", Digital video processing, Prentice Hall Processing Series, Aug. 12, 1995, pp. 98-116, Prentice Hall PTR.
Lateck, Longin Jan: "Image Similarity", Graduate Course: Computer Graphics and Image Processing, Sep. 27, 2004 (XP-002694202) Temple University, Philadelphia, retrieved from the internet: URL:http://www.cis.temple.edu/latecki/courses/CIS601-04/lectures_fall04.htm slides 5-8.
Jang, C. Cho, H-G, Automated Digital photo Classification by Tessellated Unit Block Alignment Proceedings of the International Conference on Convergence and Hybrid Information Technology 2008 (ICHIT 2008), Aug. 28-29, 2008, pp. 204 to 210, Daejon, South Korea, XP 031319705.
International Search Report and Written Opinion issued in co-pending PCT International Application No. PCT/US2011/042795 (6pp).
International Search Report dated Feb. 16, 2007, from corresponding PCT application.
Ghanbari Mohammad, "Postprocessing of late calls for Packet Video", IEEE Transactions on Circuits and Systems for Video Technology, vol. 6, No. 6 Dec. 1996, 2010.
Finnish Search Report in corresponding application No. 20095273 dated Jan. 8, 2010.
EP Search Report dated Jan. 20, 2011 for EP patent application No. 10168540.2-1522.
"Multi-core processor", Wikipedia, the free encyclopedia. Http://wikipedia.org/wiki/Multi-core_processor; dated Apr. 30, 2012.
Ferzli, R., et al.; "No-Reference Objective Wavelet Based Noise Immune Image Sharpness Metric", IEEE International Conference on Image Processing, ICIP 2005, IEEE< Piscataway, NJ, USA, vol. 1, Sep. 11, 2005, pp. 405-408.
Extended European Search Report in related matter EP 10156468 dated Jul. 30, 2013.
Guillotel, Philippe, et al.; "Comparison of motion vector coding techniques", SPIE vol. 2308, 1994, 11 pp.
WebM Project, WebM Video Hardware RTLs, http://www.webmproject.org/hardware/, 3 pp, (Jun. 27, 2012).

* cited by examiner

US 9,210,424 B1

ADAPTIVE PREDICTION BLOCK SIZE IN VIDEO CODING

TECHNICAL FIELD

This disclosure relates to encoding and decoding visual data, such as video stream data, for transmission or storage.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques.

SUMMARY

Disclosed herein are aspects of systems, methods and apparatuses for coding a video stream having a plurality of frames. One method for encoding a video stream having a plurality of frames described herein includes identifying a prediction block size distribution for at least a first frame of the plurality of frames and identifying a candidate maximum prediction block size based on the prediction block size distribution. If a level of use of the candidate maximum prediction block size is in a range defined by a high threshold value and a low threshold value, inclusive, a next maximum prediction block size for a second frame of the plurality of frames is set equal to a current maximum prediction block size for the first frame, the level of use based on the prediction block size distribution. If the level of use is greater than the high threshold value, the next maximum prediction block size is set greater than or equal to the current maximum prediction block size. If the level of use is less than the low threshold value, the next maximum prediction block size is set less than or equal to the current maximum prediction block size. Finally, the method includes encoding a second frame of the plurality of frames based on the next maximum prediction block size.

Another aspect of the disclosed implementations is an apparatus for encoding a video stream having a plurality of frames that includes a memory and a processor. The processor is configured to execute instructions stored in the memory to identify a prediction block size distribution for at least a first frame of the plurality of frames, identify a candidate maximum prediction block size based on the prediction block size distribution, if a level of use of the candidate maximum prediction block size is in a range defined by a high threshold value and a low threshold value, inclusive, set a next maximum prediction block size for a second frame of the plurality of frames equal to a current maximum prediction block size for the first frame, the level of use based on the prediction block size distribution, if the level of use is greater than the high threshold value, set the next maximum prediction block size greater than or equal to the current maximum prediction block size, if the level of use is less than the low threshold value, set the next maximum prediction block size less than or equal to the current maximum prediction block size, and encode a second frame of the plurality of frames based on the next maximum prediction block size.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Real-time video streaming, multi-point video conferencing or video broadcasting are examples of applications that employ video stream encoding including compression. One encoding technique that can reduce required bandwidth for a video stream includes prediction. In prediction, a current block to be encoded may be predicted using several portions of other frames to determine an inter prediction mode (including an optimal motion vector) by which a portion of another frame (e.g., a reference frame and/or a temporally nearby frame) is translated to form a prediction block that matches, in pixel dimensions, the current block. Alternatively, the current block may be predicted using pixels from blocks from the same frame as the current block to form the prediction block as part of an intra prediction mode. In either case, the difference between the current block and the prediction block forms a residual block that is encoded. The encoded residual block contains less data than encoding the entire original block, and can be used to recreate the original block in either a lossy or lossless fashion.

Blocks of a frame can be predicted either using one prediction mode for the entire block or the block can be divided into sub-blocks with the sub-blocks being predicted using prediction modes optimized for the sub-blocks. Dividing the blocks of a frame into sub-blocks can improve the performance of the encoding at the possible cost of increasing the number of bits included in the encoded bitstream to indicate the manner in which the blocks have been sub-divided. According to the teachings herein, performance improvements due to sub-block prediction while minimizing the number of bits used to designate sub-blocks are possible through adaptively determining a maximum block size for subsequent frames by analyzing the distribution of sub-blocks in a current frame.

First discussed below are environments in which aspects of this disclosure can be implemented, and then details of certain implementations are explained.

Figure 1:
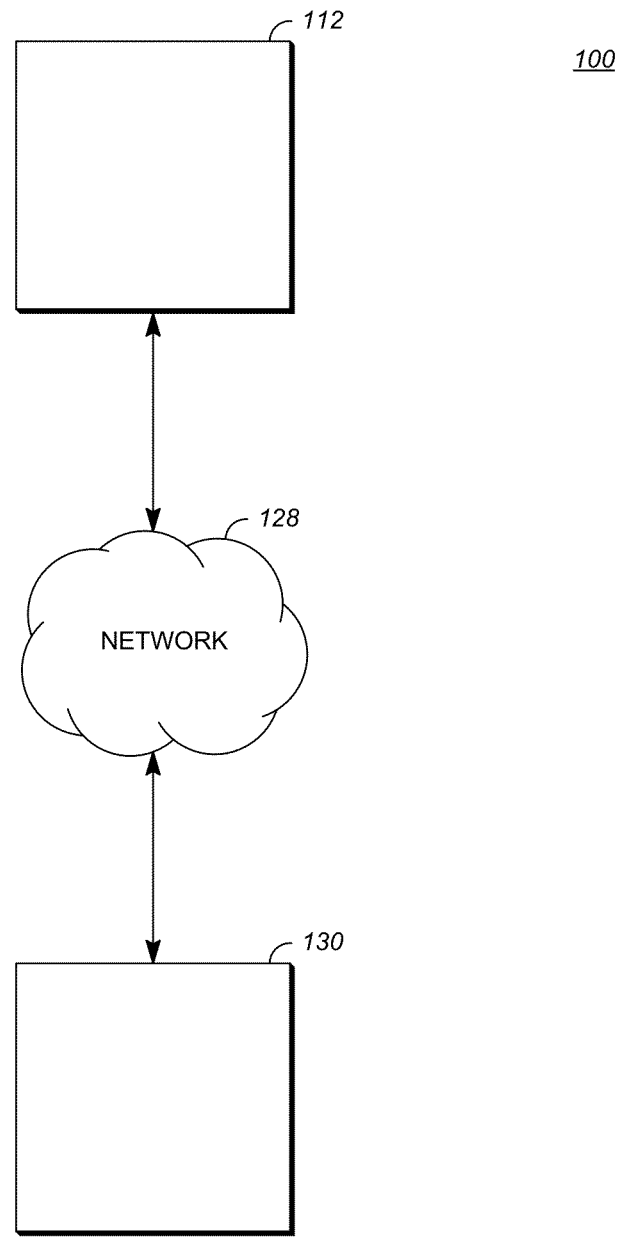
FIG. 1 is a schematic diagram of a video encoding and decoding system.

FIG. 1 is a schematic diagram of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
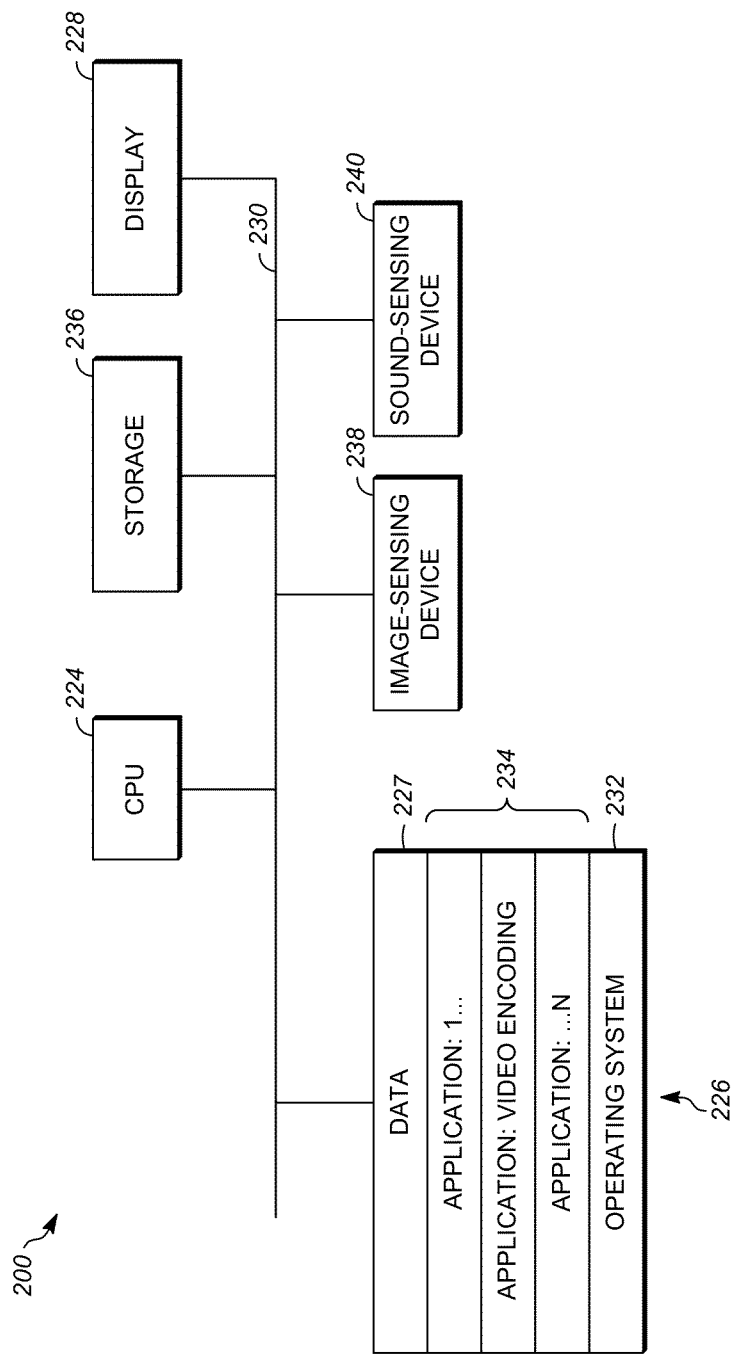
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video communication application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
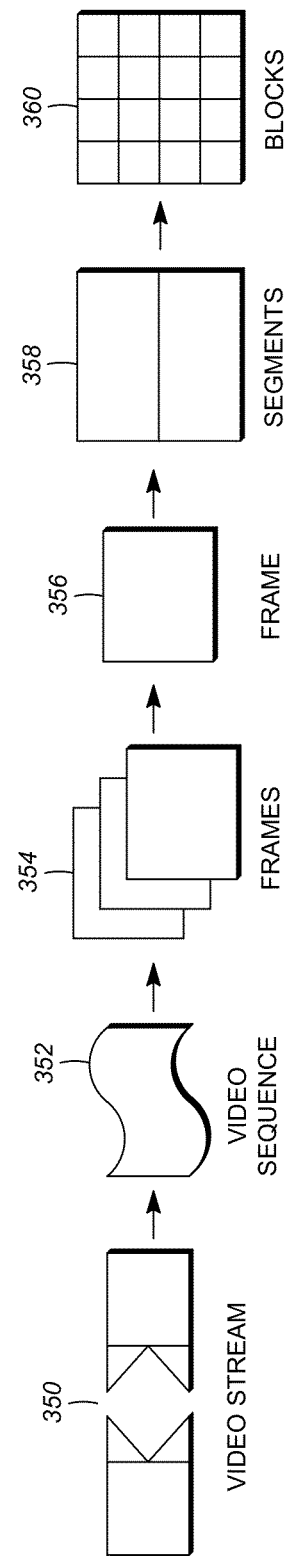
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, a single frame 356 can be divided into a series of segments or planes 358. Segments or planes 358 can be subsets of frames that permit parallel processing, for example.

Segments or planes 358 include blocks 360, which can contain data corresponding to, for example, 64×64 pixels, 32×32 pixels or 16×16 pixels in frame 356. Blocks 360 can also be of any other suitable size such as 4×4 pixels, 8×8 pixels, 16×8 pixels, 8×16 pixels, 16×16 pixels or larger. The pixel data may include data corresponding to a luminance plane or chrominance plane of the image captured by frame 356. Unless otherwise noted, the terms block and macroblock are used interchangeably herein.

Figure 4:
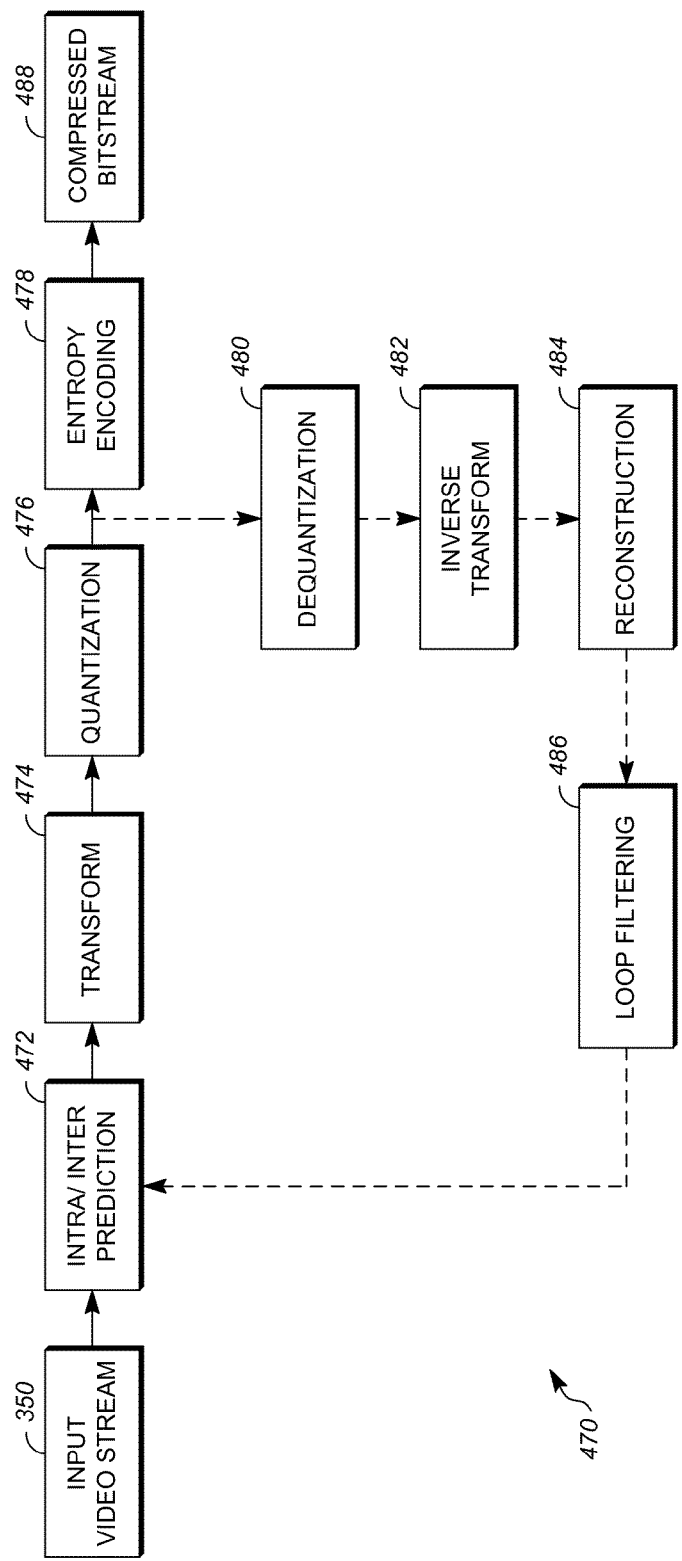
FIG. 4 is a block diagram of a video compression system in accordance with an implementation.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 within video stream 350 can be processed in units of blocks 360. At intra/inter prediction stage 472, each block can be encoded using intra-frame prediction (also called intra prediction) or inter-frame prediction (also called inter prediction). In either case, a prediction block is formed as described briefly above. In the case of intra prediction, the prediction block can be formed from adjacent pixels to a block in the current frame that have been previously encoded and reconstructed. In the case of inter prediction, the prediction block can be formed from portions of one or more previously constructed frames (e.g., a reference frame).

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), the Asymmetrical Discrete Sine Transform (ADST) and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
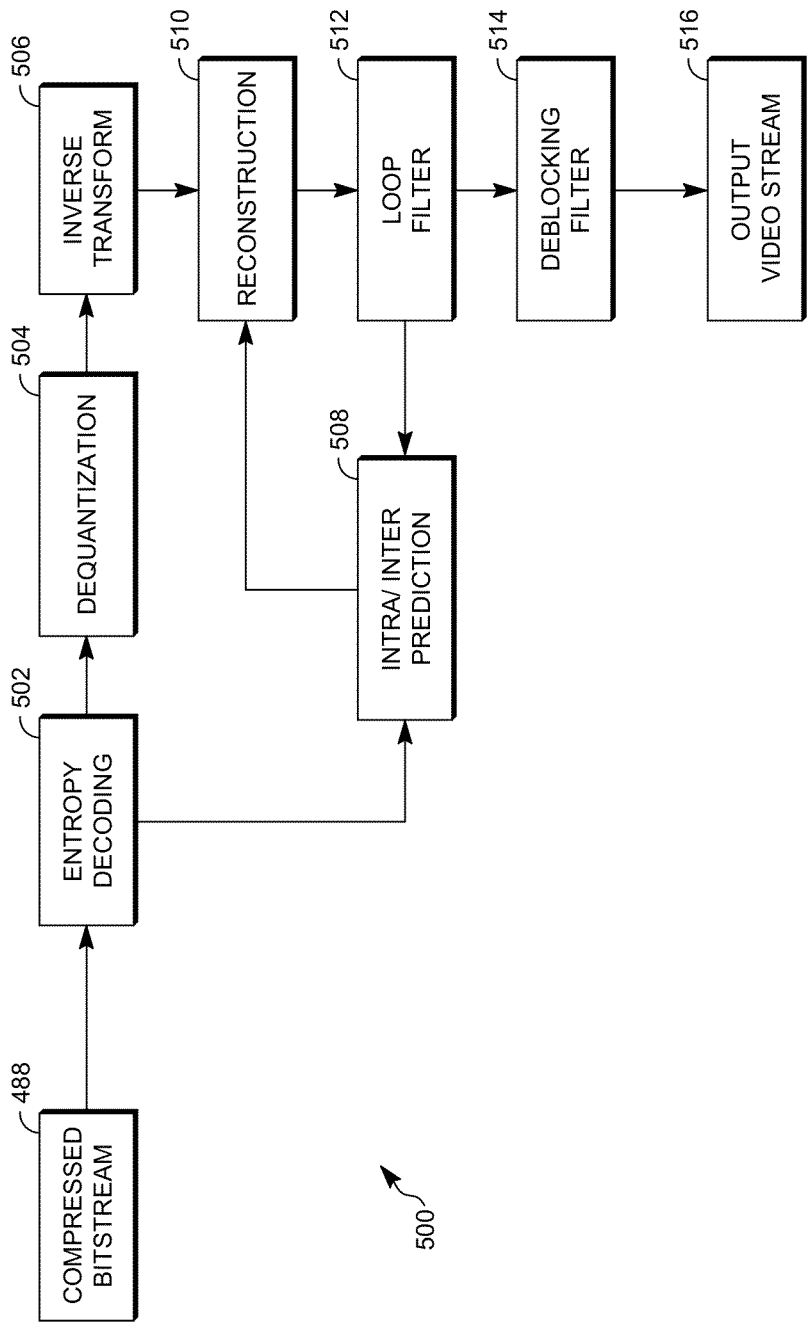
FIG. 5 is a block diagram of a video decompression system in accordance with another implementation.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, deblocking filtering stage 514 can be applied to the reconstructed block to reduce blocking distortion, and the result is output as output video stream 516.

Output video stream 516 can also be referred to as a decoded video stream and the terms will be used interchangeably herein.

Other variations of decoder 500 can be used to decode compressed bitstream 488. For example, decoder 500 can produce output video stream 516 without deblocking filtering stage 514.

As mentioned briefly above, a block to be encoded may be a larger block that is divided into smaller blocks of different sizes for prediction. The block may also be divided into smaller blocks of different sizes for the remaining encoding steps. In some embodiments, the block may not be subdivided for prediction and/or further steps. In either case, a largest or maximum prediction block size may be specified in a frame or picture header. One way to select the maximum prediction block size is based on the resolution of the input video sequence. However, this selection technique can lead to a sub-optimal solution and wasted bits in the compressed bitstream because resolution does not always correlate with the level of detail or complexity in the picture or frame.

In general, it is more desirable to have a smaller maximum prediction block size when blocks have a high level of detail or complexity. This is because the prediction block size can range from 64×64 pixels down to 4×4 pixels, for example. With a maximum prediction block size of 64×64 pixels, for example, many bits would be needed to specify the split into smaller coding blocks, such as from 64×64 pixels to 4—32× 32 pixels to 4—16×16 pixels to 4—8×8 pixels (and optionally to 4—4×4 pixels), where splitting is done three times to get the 8×8-pixel blocks that can be further split into 4×4-pixel blocks. When the maximum prediction block size is smaller, fewer bits are required to specify the split into smaller coding blocks as needed.

An adaptive or dynamic approach for selecting and adjusting maximum prediction block size (also called a coding tree block size) is next described.

Figure 6:
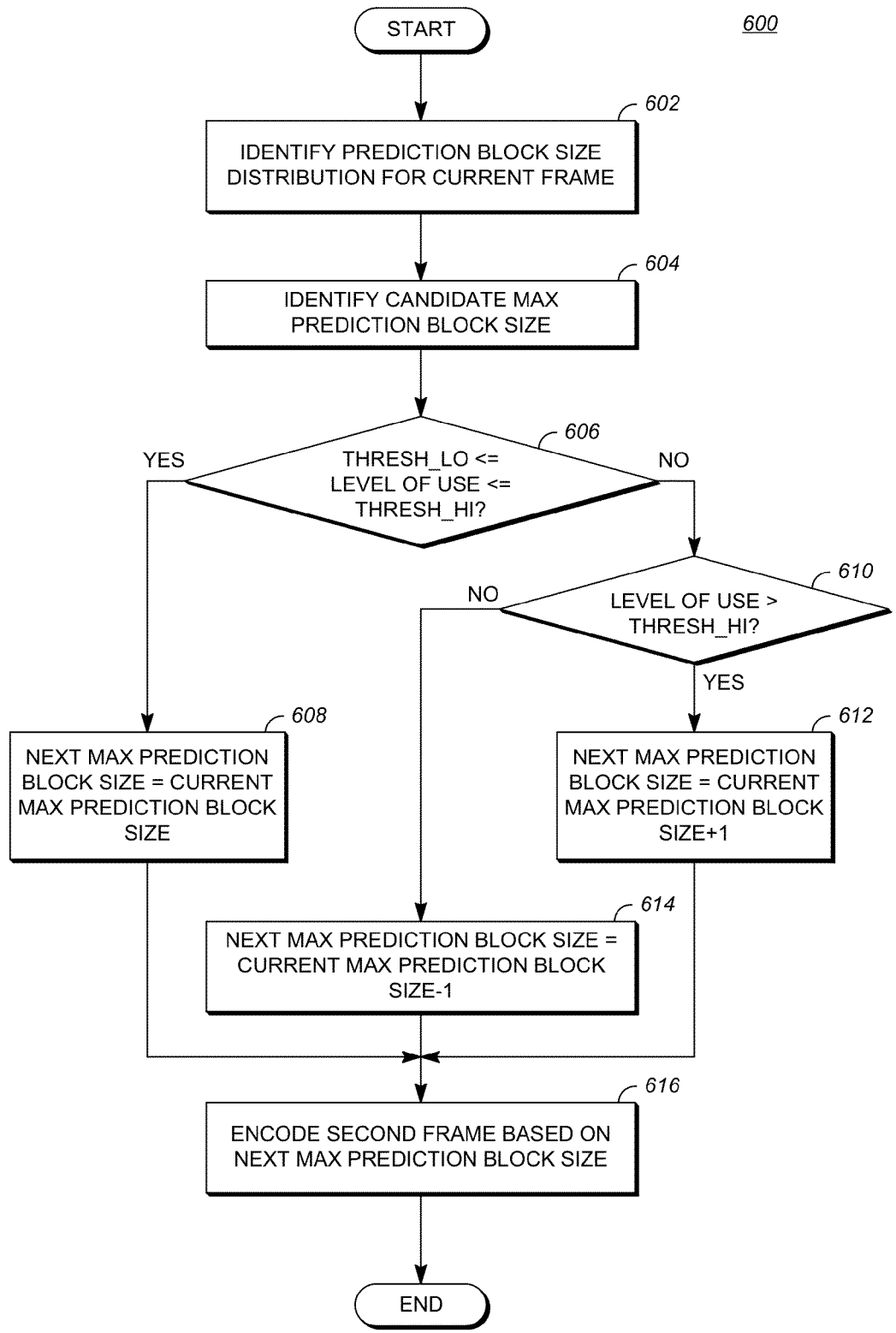
FIG. 6 is a flowchart diagram of a process for determining a maximum prediction block size for frames of a video stream in accordance with the teachings herein.

FIG. 6 is a flowchart diagram of a process 600 for determining a maximum prediction block size for frames of a video stream in accordance with the teachings herein. Process 600 can be implemented in a system such as system 470 to encode a video stream as, for example, a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter. Generally, a prediction block distribution can be identified by processing one or more frames to determine optimal prediction block sizes for the blocks of the frames and tabulating the results to form a distribution of block sizes versus the percentage of the frame each block size covers. The distribution can be formed using one frame of the video stream or more than one frame and can be used to select a maximum prediction block size for further frames.

Process 600 begins at step 602 where a prediction block size distribution is identified for the current frame. As used herein, the term "identify" means to indicate, determine, construct, select, specify or identify in any manner whatsoever. As described in relation to FIG. 3, a frame of video data can include a plurality of blocks with a maximum prediction block size. Each of the blocks may be predicted using various prediction block sizes, such as one or more sub-blocks (also called prediction blocks) of sizes 64×64, 32×32, 16×16, 8×8 and/or 4×4 pixels, for example.

Prediction encoding relies on redundancy in video stream data to compress video data to minimize the difference between a prediction block and the current block. Each of inter prediction and intra prediction may be performed in any one of several different modes, including different sub-block sizes. Encoders can perform a rate/distortion loop, where the various prediction modes and sub-block sizes are tested to determine the distortion, or difference between the input block data and the encoded/decoded block data for a given rate, or number of bits required to represent the encoded block in the encoded video bitstream. The prediction mode and sub-block sizes having the lowest distortion at a desired rate may be regarded as optimal and thereby can be selected for use in compressing the block.

Inter prediction and intra prediction can yield different distributions of prediction block sizes. By keeping track of the prediction block sizes based on the type of prediction performed, a maximum prediction block size can be used depending upon the predominant type of prediction used to process a frame.

Figure 7:
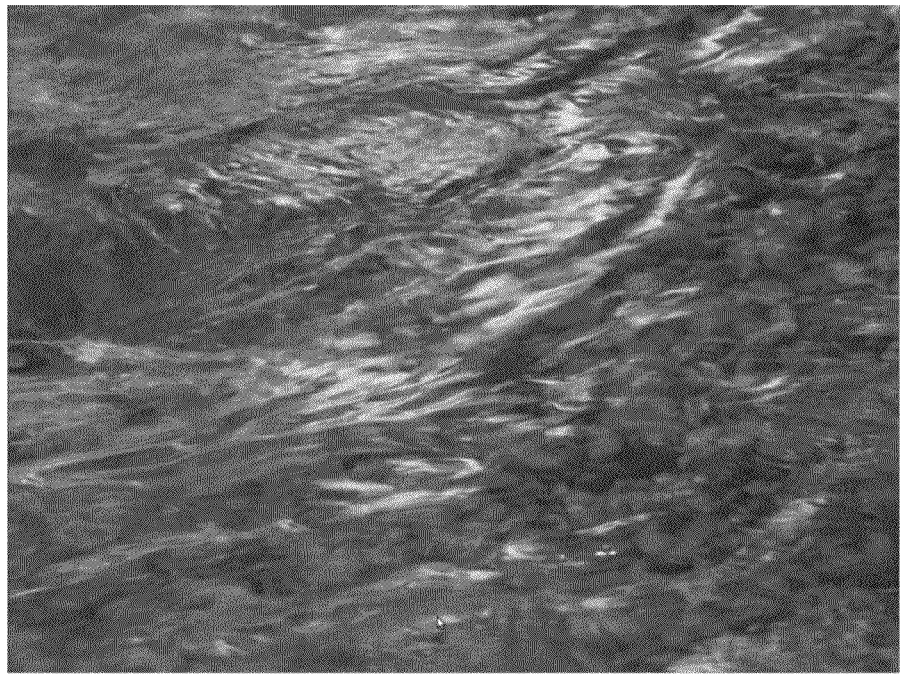
FIG. 7 is a diagram of an input video frame with a high degree of intensity variation.
Figure 8:
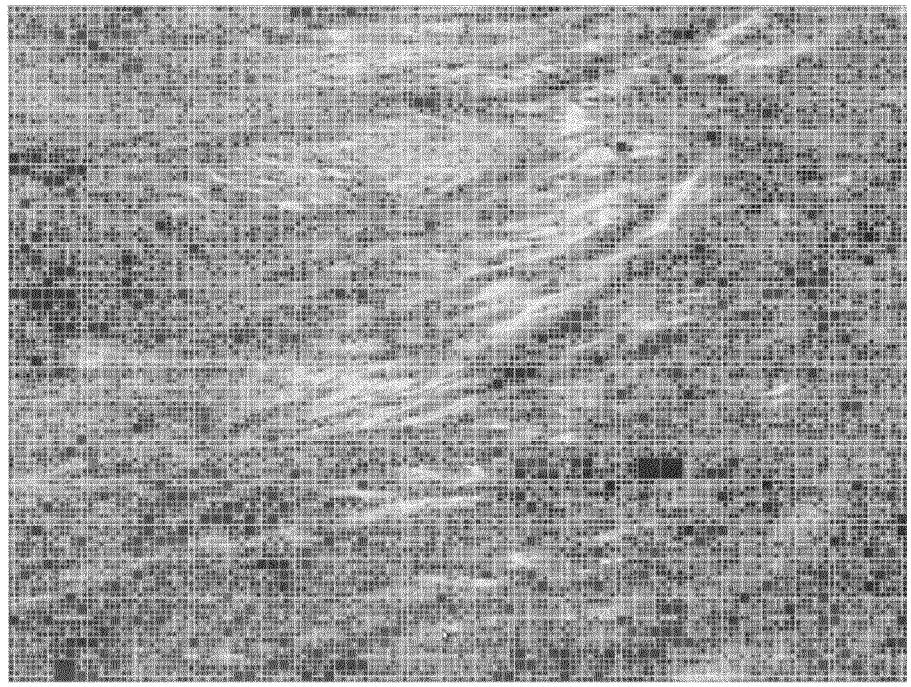
FIG. 8 is a modified diagram of the input video frame of FIG. 7 overlaid with prediction blocks.

This concept may be explained by reference to FIGS. 7-10. FIG. 7 is diagram of an input video frame 700 with a high degree of intensity variation, and FIG. 8 is a modified diagram 800 of the input video frame 700 of FIG. 7 overlaid with prediction blocks. The blocks of input video frame 700 can be divided into sub-blocks according to the optimal prediction modes selected so as to generate diagram 800. Table 1 shows prediction block sizes compared to the percentage of the frame area covered by each block size for a hypothetical frame with a high degree of intensity variation.

TABLE 1

| Block Size | Frame area covered (%) |
|---|---|
| 64 × 64 | 0 |
| 32 × 32 | 0 |
| 16 × 16 | 10 |
| 8 × 8 | 30 |
| 4 × 4 | 60 |

Splitting each maximally-sized block into smaller prediction sub-blocks like this can be represented by a data structure called a quad tree. Recursive splitting of a block both horizontally and vertically can result in a quad tree representation where the root node corresponds to the maximum block size. In this example, and assuming a maximum prediction block size of 64×64 pixels, a large number of bits is required to specify the splitting into the smaller prediction sub-blocks (also called prediction units herein). By using a smaller maximum prediction block size, the depth of the quad tree can be made smaller. This can result in requiring fewer bits to represent the split in the encoded video bitstream, making it more efficient in terms of bits required to represent the encoded frame to specify a smaller maximum prediction block size for the frame.

Figure 9:
FIG. 9 is a diagram of an input video frame with a low degree of intensity variation.
Figure 10:
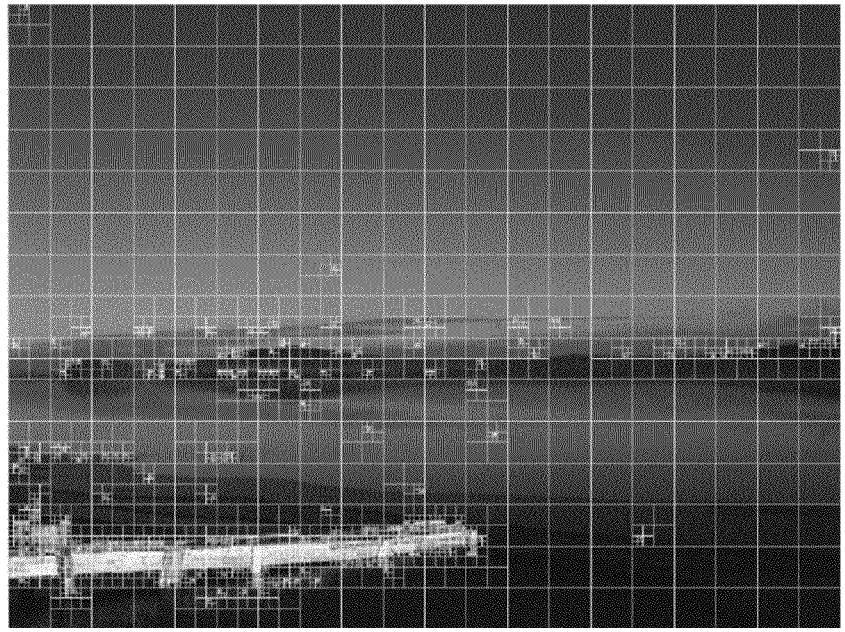
FIG. 10 is a modified diagram of the input video frame of FIG. 9 overlaid with prediction blocks.

FIG. 9 is diagram of an input video frame 900 with a low degree of intensity variation, and FIG. 10 is a modified diagram 1000 of the input video frame 900 of FIG. 9 overlaid with prediction blocks. The relatively low degree of intensity variation in FIG. 9 is the result of large portions of the frame formed of a smooth, slowly varying background. In contrast to frame 700, the encoder has selected much larger block sizes to predict much of frame 900 as shown in FIG. 10. In this case, it can be beneficial in terms of bit-savings to encode the frame using a large maximum prediction block size. Table 2 1 shows prediction block sizes compared to the percentage of the frame area covered by each block size for a hypothetical frame with a relatively low degree of intensity variation.

TABLE 2

| Block Size | Frame area covered (%) |
| --- | --- |
| 64 × 64 | 60 |
| 32 × 32 | 20 |
| 16 × 16 | 15 |
| 8 × 8 | 4 |
| 4 × 4 | 1 |

Returning to FIG. 6, a candidate maximum prediction block size is identified at step 604 using the prediction block size distribution formed at step 602. Note that, in this implementation, the frame will have a current maximum prediction block size previously identified and the frame will be encoded using this current maximum prediction block size. The candidate maximum prediction block size is identified as the frame is processed for use in forming a next maximum prediction block size that will become the current maximum prediction block size for a subsequent frame in the video stream to be encoded by the encoder.

A technique for identifying the candidate maximum prediction block size using the prediction block size distribution may include forming a cumulative distribution. A cumulative distribution can sum the percentages starting with the smallest block size and continuing to the largest block size. The cumulative frame area (%) gives the frame area covered by a given block size and the sum of all smaller block sizes. A cumulative distribution for the distribution data in Table 1 is shown in Table 3.

TABLE 3

| Block Size | Cumulative Frame Area (%) |
| --- | --- |
| 64 × 64 | 100 |
| 32 × 32 | 100 |
| 16 × 16 | 100 |
| 8 × 8 | 90 |
| 4 × 4 | 60 |

In one example, the block size (16×16 pixels) that covers a cumulative area greater than or equal to at least 95% of the frame area is identified as the candidate maximum prediction block size. Values other than 95% of the frame area may be chosen.

Other techniques for identifying a candidate prediction block size can be used. For example, the most commonly occurring block size can be selected as the candidate maximum prediction block size. For example, the candidate maximum prediction block size would be 4×4 for the distribution data shown in Table 1 and would be 64×64 for the distribution data shown in Table 2. Other techniques for selecting the candidate maximum prediction block size could also be used including selecting the largest block size with a non-zero entry, for example.

At step 606, the level of use of the candidate maximum prediction block size is compared to two thresholds to determine whether and how to change the current maximum prediction block size based on the candidate maximum prediction block size for the next maximum prediction block size. When the level of use is within a range defined by the thresholds, the next maximum prediction block size is set equal to the current maximum prediction block size. Otherwise, the next maximum prediction block size is set greater than or less than the current maximum prediction block size, if possible, depending on the relationship of the candidate maximum prediction block size to the thresholds.

To implement this comparison, for example, the cumulative percentage of frame area covered by the candidate maximum prediction block size (as an example of the level of use) may be compared to THRESH_LO and THRESH_HI at step 606. The two thresholds may be identified using the cumulative prediction block distribution related to the previously identified current maximum prediction block size and may be based on the currently calculated coverage area for the various block sizes. The cumulative percentage frame area covered by the current maximum prediction block size is increased by a first percentage to form THRESH_HI and decreased by a second percentage to form THRESH_LO.

Referring to Table 3, for example, the cumulative covered frame area for a current maximum prediction block size of 8×8 pixels is 90%. The value THRESH_HI is equal to 92.5% and the value of THRESH_LO is equal to 87.5%. In this example, the first and second percentages are both equal to 2.5%, although other values may be used. The level of use for a candidate maximum prediction block size of 16×16 pixels from Table 3 is 100%, which is greater than 92.5%.

If the level of use associated with the candidate maximum prediction block size is greater than or equal to THRESH_LO and less than or equal to THRESH_HI in step 606, the next maximum prediction block size is set to the current maximum prediction block size at step 608, meaning that there is no change in the maximum prediction block size for the next frame to be processed.

At step 606, if the level of use associated with the candidate maximum prediction block size is not within the interval defined by THRESH_LO and THRESH_HI, process 600 branches to step 610. At step 610, the covered area is compared to THRESH_HI to determine whether the level of use is greater than or less than the threshold interval. In the case where the level of use is greater than THRESH_HI, process 600 advances to step 612 where the next maximum prediction block size is set equal to the block size one greater than the current maximum prediction block size. An exception to this is in cases where the current maximum prediction block size is already at the largest prediction block size available to the encoder. In that case, the next maximum prediction block size can be set to the largest prediction block size.

If instead at step 610 the level of use is not greater than THRESH_HI (and thus is less than THRESH_LO), process 600 branches to step 614. At step 614, process 600 sets the next maximum prediction block size equal to a block size one block size smaller than the current maximum prediction block size. An exception to this is in cases where the current maximum prediction block size is already at the smallest prediction block size available to the encoder. In that case, the next maximum prediction block size can be set to the smallest prediction block size.

Following any of steps 608, 612 and 614, process 600 has set the next maximum prediction block size. Thus, at step 616, process 600 encodes the next frame of video data using the next maximum prediction block size. The maximum prediction block size may be included in a header for each frame, and other information used to encode the blocks is included in the frame or block headers, for example. The frame is then encoded using prediction blocks having a size from the smallest prediction block size to the maximum prediction block size, inclusive, depending on the rate-distortion calculations where the smallest prediction block size may also be equal to the maximum prediction block size. Note that while only one frame is described as identifying the prediction block size distribution and thus the candidate maximum prediction block size, the data can be accumulated over a series of frames such that several frames in the sequence before the current frame may be used to determine the next maximum prediction block size. It may also be desirable in some implementations to use different thresholds for different frame types (e.g., Intra (I), Predicted (P), Bidirectionally predicted (B), etc.) and calculate the block distribution function for each frame type separately.

By adaptively setting the maximum prediction block size as described above, a value for the maximum prediction block size may be converged upon that minimizes the number of bits required to describe the prediction blocks while providing optimal prediction block sizes. This can improve compression efficiency, for example, when a scene is changing or an initial maximum prediction block size is suboptimal.

An encoded video bitstream including blocks encoded according to the teachings herein may be decoded by a decoder that interprets bits included in headers in the bitstream that describes the encoding parameters of each block. Using the information from the bits, including the optimal prediction mode and size, a prediction block is created and added a residual block generated using data from the bitstream to generate a current block to be decoded. The remaining encoded blocks can be similarly decoded.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream having a plurality of frames comprising:

identifying a prediction block size distribution for at least a first frame of the plurality of frames;

identifying, using a processor, a candidate maximum prediction block size based on the prediction block size distribution;

if a level of use of the candidate maximum prediction block size is in a range defined by a high threshold value and a low threshold value, inclusive, setting a next maximum prediction block size for a second frame of the plurality of frames equal to a current maximum prediction block size for the first frame, the level of use based on the prediction block size distribution;

if the level of use is greater than the high threshold value, setting the next maximum prediction block size greater than or equal to the current maximum prediction block size;

if the level of use is less than the low threshold value, setting the next maximum prediction block size less than or equal to the current maximum prediction block size; and encoding a second frame of the plurality of frames based on the next maximum prediction block size.

2. The method of claim 1 wherein identifying the candidate maximum prediction block size is based on a cumulative distribution function of the prediction block size distribution.

3. The method of claim 1 wherein identifying the candidate maximum prediction block size comprises identifying a block size having a cumulative distribution value that includes at least 95% of a frame area of the at least the first frame encoded using the block size.

4. The method of claim 1, further comprising:
identifying the level of use based on a cumulative percentage of frame area covered by blocks having sizes equal to or less than the candidate maximum prediction block size.

5. The method of claim 1 wherein the high threshold value is equal to the cumulative percentage plus 2.5%.

6. The method of claim 5 wherein the low threshold value is equal to the cumulative percentage minus 2.5%.

7. The method of claim 1 wherein identifying the prediction block size distribution for the at least the first frame of the plurality of frames, comprises:
identifying prediction block sizes used to predict blocks of the first frame; and
calculating a percentage of frame area covered by each block size of the prediction block sizes.

8. The method of claim 1 wherein setting the next maximum prediction block size for the second frame less than or equal to the current maximum prediction block size comprises:
reducing the current maximum prediction block size to set the next maximum prediction block size if the current maximum prediction block size is greater than a smallest allowed prediction block size for the video stream.

9. The method of claim 8 wherein setting the next maximum prediction block size for the second frame less than or equal to the current maximum prediction block size comprises:
setting the next maximum prediction block size equal to the smallest allowed prediction block size if the current maximum prediction block size is equal to the smallest allowed prediction block size.

10. The method of claim 1 wherein setting the next maximum prediction block size for the second frame greater than or equal to the current maximum prediction block size comprises:

increase the current maximum prediction block size to set the next maximum prediction block size if the current maximum prediction block size is less than a largest allowed prediction block size for the video stream.

11. The method of claim 10 wherein setting the next maximum prediction block size for the second frame greater than or equal to the current maximum prediction block size comprises:
setting the next maximum prediction block size equal to the largest allowed prediction block size if the current maximum prediction block size is equal to the largest allowed prediction block size.

12. An apparatus for encoding a video stream having a plurality of frames comprising:
a memory; and
a processor configured to execute instructions stored in the memory to:
identify a prediction block size distribution for at least a first frame of the plurality of frames;
identify a candidate maximum prediction block size based on the prediction block size distribution;
if a level of use of the candidate maximum prediction block size is in a range defined by a high threshold value and a low threshold value, inclusive, set a next maximum prediction block size for a second frame of the plurality of frames equal to a current maximum prediction block size for the first frame, the level of use based on the prediction block size distribution;
if the level of use is greater than the high threshold value, set the next maximum prediction block size greater than or equal to the current maximum prediction block size;
if the level of use is less than the low threshold value, set the next maximum prediction block size less than or equal to the current maximum prediction block size; and
encode a second frame of the plurality of frames based on the next maximum prediction block size.

13. The apparatus of claim 12 wherein the processor is configured to identify the prediction block size distribution for the at least the first frame of the plurality of frames by:
identifying prediction block sizes used to predict blocks of the at least the first frame; and
calculating a percentage of frame area covered by each block size of the prediction block sizes.

14. The apparatus of claim 13 wherein the processor is configured to:
calculate a cumulative distribution function using the prediction block size distribution by summing, for each prediction block size of the prediction block sizes, the percentage of frame area covered for sizes less than or equal to the prediction block size; and wherein the processor is configured to identify the candidate maximum prediction block size by:
selecting a prediction block size of the prediction block sizes having a cumulative percentage of frame area covered that is equal to or greater than a defined percentage as the candidate maximum prediction block size.

15. The apparatus of claim 14 wherein the high threshold value is equal to 2.5% above the cumulative percentage and the low threshold value is equal to 2.5% below the cumulative percentage.

16. The apparatus of claim 13 wherein the at least the first frame comprises at least two frames in the video stream temporally located before the second frame.

17. The apparatus of claim 12 wherein the processor is configured encode the video stream using a plurality of prediction block sizes between a smallest allowed prediction block size and a largest allowed prediction block size; and wherein the processor is configured to encode the second frame using prediction blocks having a size from the smallest allowed prediction block size to the next maximum prediction block size, inclusive.

18. The apparatus of claim 17 wherein the processor is configured to set the next maximum prediction block size for the second frame less than or equal to the current maximum prediction block size by:
- reducing the current maximum prediction block size to set the next maximum prediction block size if the current maximum prediction block size is greater than the smallest allowed prediction block size for the video stream; and
- setting the next maximum prediction block size equal to the smallest allowed prediction block size if the current maximum prediction block size is equal to the smallest allowed prediction block size.

19. The apparatus of claim 18 wherein the processor is configured to set the next maximum prediction block size for the second frame greater than or equal to the current maximum prediction block size by:
- increase the current maximum prediction block size to set the next maximum prediction block size if the current maximum prediction block size is less than the largest allowed prediction block size for the video stream; and
- setting the next maximum prediction block size equal to the largest allowed prediction block size if the current maximum prediction block size is equal to the largest allowed prediction block size.

20. The apparatus of claim 17 wherein the processor is configured to set the next maximum prediction block size for the second frame greater than or equal to the current maximum prediction block size by:
- increase the current maximum prediction block size to set the next maximum prediction block size if the current maximum prediction block size is less than the largest allowed prediction block size for the video stream; and
- setting the next maximum prediction block size equal to the largest allowed prediction block size if the current maximum prediction block size is equal to the largest allowed prediction block size.

\* \* \* \* \*